United States Patent [19]

Watanabe et al.

[11] 3,890,564

[45] June 17, 1975

[54] APPARATUS FOR INDUCING EDDY CURRENT IN A SEMICONDUCTOR WAFER FOR MEASURING THE ELECTRIC CONDUCTIVITY OR RESISTIVITY THEREOF

[75] Inventors: Takashi Watanabe; Koichi Watamura; Kazuya Kawatani; Hideo Aoki, all of Tokyo, Japan

[73] Assignee: Ohkura Electric Company, Limited, Tokyo, Japan

[22] Filed: Nov. 3, 1972

[21] Appl. No.: 303,594

[30] Foreign Application Priority Data

| July 4, 1972 | Japan | 47-66847 |
| July 4, 1972 | Japan | 47-78931 |
| July 4, 1972 | Japan | 47-78932 |
| July 4, 1972 | Japan | 47-78933 |
| July 4, 1972 | Japan | 47-78934 |

[52] U.S. Cl. .............................................. 324/40
[51] Int. Cl. ............................................ G01r 33/12
[58] Field of Search .......... 324/34 R, 40, 41, 34 TK

[56] References Cited
UNITED STATES PATENTS

| 2,057,835 | 10/1936 | Karajan et al. | 324/34 TK |
| 2,550,688 | 5/1951 | Gossick | 324/41 |
| 2,764,734 | 9/1956 | Yates | 324/40 |
| 3,061,775 | 10/1962 | Reznowski | 324/41 |
| 3,205,485 | 9/1965 | Noltingk | 324/40 |
| 3,229,198 | 1/1966 | Libby | 324/40 |
| 3,302,105 | 1/1967 | Libby et al. | 324/40 |
| 3,337,796 | 8/1967 | Hentschel et al. | 324/40 |
| 3,665,298 | 5/1972 | Geiger | 324/41 |

*Primary Examiner*—Robert J. Corcoran

[57] ABSTRACT

An apparatus for measuring electric conductivity or resistivity of a semiconductor wafer with no electric contact to the wafer, which comprises an exciting circuit including a first exciting coil for measuring, and a second exciting coil for compensation, which are connected in series to each other, and an oscillator for supplying an alternating current to the first and second exciting coils. A detecting circuit has a first detecting coil which is positioned spaced apart from the first exciting coil to form a gap therebetween, the wafer being inserted in the gap for measurement, and a second detecting coil for compensation which is connected in series to the first detecting coil and is magnetically connected to the second exciting coil, thereby a differential output being obtained between each end of the first, and second detecting coils. A bandpass filter eliminates higher harmonics and noise component and is contained in the output of the detecting circuit, and a phase shifter shifts the phase of the output of the bandpass filter to the phase of the voltage induced in the second detecting coil. A synchronous rectifier means rectifies synchronously the output of the phase shifter with reference to the output of the detecting circuit, and an operation circuit means is provided to obtain an output proportional to the electric conductivity or resistivity of the wafer from the output of the synchronous rectifier means and data concerning the thickness of the wafer. An indicator means indicating the output of the operation circuit means.

7 Claims, 8 Drawing Figures

PATENTED JUN 17 1975　　3,890,564
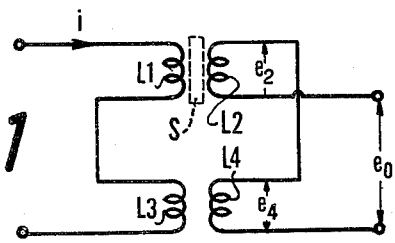
FIG. 1
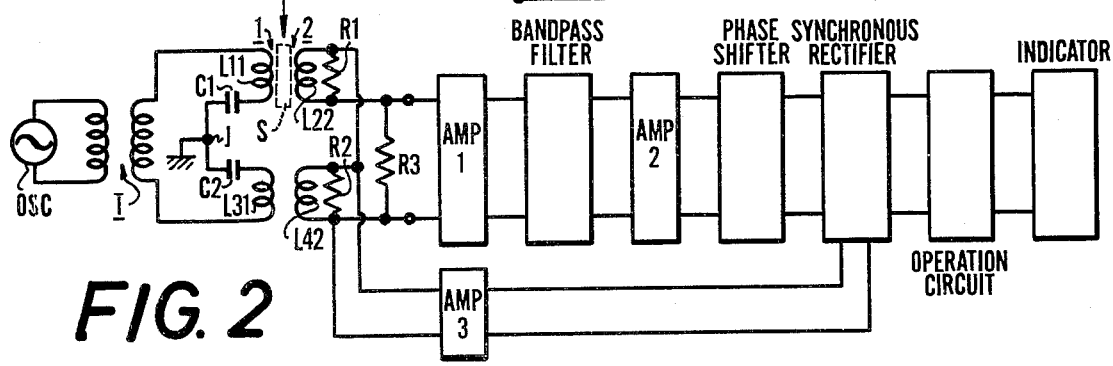
FIG. 2
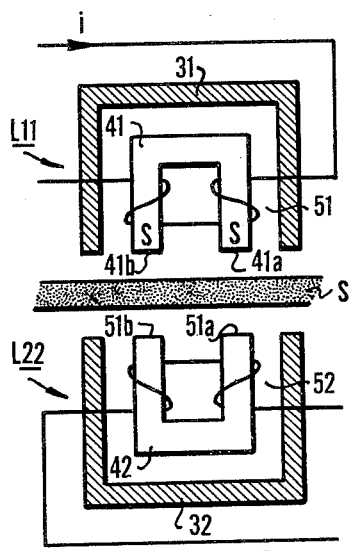
FIG. 3
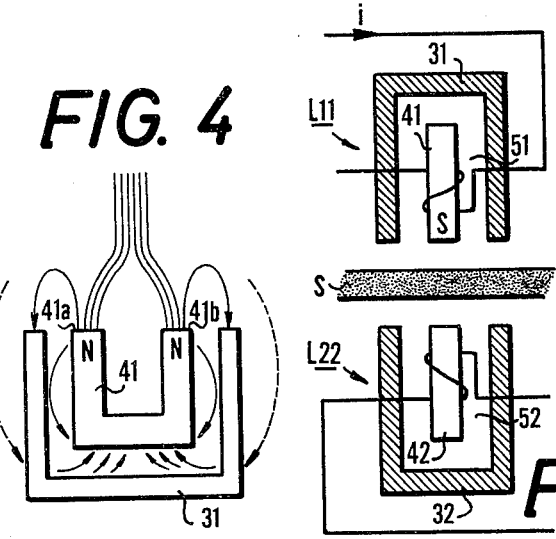
FIG. 4
FIG. 5
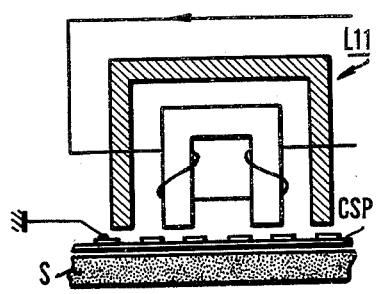
FIG. 6
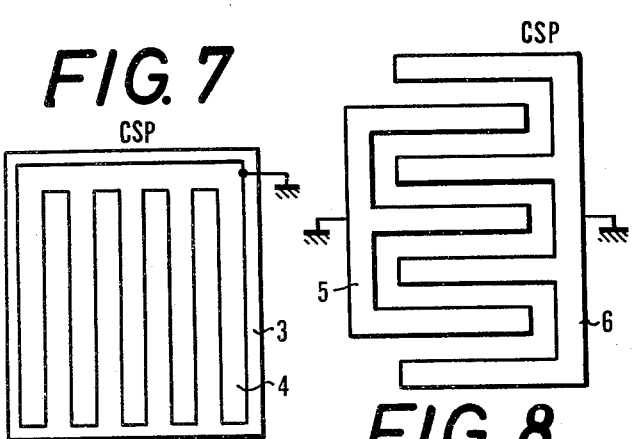
FIG. 7
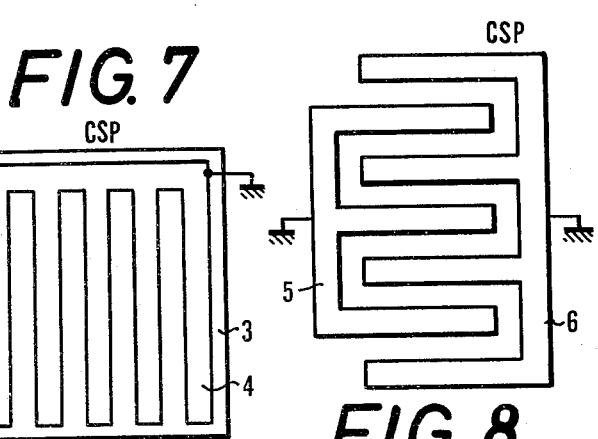
FIG. 8

APPARATUS FOR INDUCING EDDY CURRENT IN A SEMICONDUCTOR WAFER FOR MEASURING THE ELECTRIC CONDUCTIVITY OR RESISTIVITY THEREOF

BACKGROUND OF THE INVENTION

This invention relates to apparatus for measuring electric conductivity or resistivity of an electroconductive body, such as a semiconductor wafer without using any electric contact.

As is well known in the art in the manufacture of semiconductor devices such as a semiconductor integrated circuit or the like it is necessary to measure the electric conductivity or resistivity at various portions of a semiconductor wafer of silicon or germanium, for example. Since conductivity is a reciprocal of resistivity $\rho$, that is $1/\rho$, in the following description, apparatus for measuring conductivity will be descussed.

According to a prior art method of measuring conductivity a plurality of probes are pressed against a semiconductor wafer to pass a current through the wafer via such probes for detecting the voltages across the probes. In such a method, however, since sharply pointed ends of the probes are pressed against the surface of the wafer, the crystal structure of the wafer is often destroyed.

We have devised a measuring apparatus comprising serially connected exciting coils $L_1$ and $L_3$ which are supplied with an alternating current $i$ from an oscillator, not shown, and a pair of detection coils $L_2$ and $L_4$ which are spaced apart to form a definite distance from exciting coils $L_1$ and $L_3$, respectively and are connected in series to have opposite polarities to each other as shown in FIG. 1. A sample S to be measured, such as a semiconductor wafer is interposed between coils $L_1$ and $L_2$ whereby the the differential voltage $e_0$ between voltages $e_2$ and $e_4$ induced in coils $L_2$ and $L_4$ respectively is measured to determine the electric conductivity of the sample.

The principle of determining the conductivity of the sample S from the differential voltage $e_0$ is as follows:

Let us denote the current supplied from the oscillation to the exciting coils $L_1$ and $L_3$ by $M_{11}$, that between coils $L_3$ and $L_4$ by $M_{12}$, that between coil $L_1$ and sample S by $M_1$ and that between sample S and coil $L_2$ by $M_2$. When sample S is interposed between coils $L_1$ and $L_2$, an eddy current inversely proportional to the resistivity of the sample S is induced therein, and the magnetic flux created by the eddy current induces a voltage in the detection coil $L_2$ in superposed relationship upon the voltage induced therein by the mutual inductance between coils $L_1$ and $L_2$. This differential voltage is expressed by $$e_0 = -j\omega (M_{11} - M_{12}) i - (W i/\rho) \Sigma (\omega^2 M_1 M_2)/(2\pi r) \Delta r \ldots$$

where
- $\omega$: the thickness of the sample,
- $\rho$: the resistivity of the sample,
- $\Delta r$: the incremental with along a radius $r$ of the concentric eddy current induced in the sample, and
- $\omega$: the angular velocity of the alternating current $i$ flowing through the exiting coils $L_1$ and $L_3$.

The resistivity $\rho$ to be determined is contained in the second term on the righthand side of equational, which represents the electromotive force induced in detection coil $L_2$ by the eddy current in sample S. Various parameters headed by symbol $\Sigma$ in the second term are releated to the construction of coils $L_1$ through $L_4$, the relative position thereof, the operating frequency of the oscillator, etc. so that it is possible to treat them as a constant. Moreover, as the first term on the righthand side become zero if $M_{11}$ and $M_{12}$ are designed to be equal, it will be clear that it is possible to determine the resistivity $\rho$ by measuring the differential voltage $e_0$.

However, when reducing into practice the concept described above, there are following troubles. (a) The eddy current flows along a loop on the outside of the magnetic flux so that the eddy current has a certain width. As a result a portion of the loop of the eddy current will be interrupted when the $\rho$ at a portion near the periphery of the wafer is measured thus disturbing the flow of the eddy current and causing an error in the result of measurement. (b) The resistivity $\rho$ of certain semiconductor bodies is about 10 to 100 ohm-cm which is much higher than the resistivity of copper, for example, of 1.69 microohm-cm, thereby greatly decreasing the eddy current. As a result where the resistivity of the semiconductor body is high, the induced voltage caused by the eddy current and detected by the detection coil $L_2$ will be masked by a noise current thus rendering it impossible to measure it.

For this reason, in order to solve the problem (a) it is necessary to as far as possible reduce the dimensions of coils $L_1$ and $L_2$. However, this solution makes more serious the problem (b), so that it is essential to increase the absolute value of the second term on the righthand side of equation 1 to eliminate problem (b).

Among the measures for increasing said absolute value or the induced power caused by the eddy current are included increase in the frequency of the oscillator which energizes exciting coil $L_1$, increase in the input current, and increase in the mutual inductances $M_1$ and $M_2$. On the other hand in order to minimize the error of the measurement it is essential to match the phases of the voltages induced in detection coils $L_2$ and $L_4$. To attain this it is necessary to connect in series exciting coils $L_1$ and $L_3$. This connection, however, increases by a factor of (2) the impedance of the exciting circuit beyond that of a single coil. Increase in the frequency and the mutual inductances as above described results in further increase in the circuit impedance with the result that unless the output voltage of the oscillator is increased sufficiently large input current can not be assured. However, when the oscillation frequency of the oscillator is increased the effect of an extremely small electrostatic capacitance prevailing between coils $L_1$ and $L_2$ becomes significant. In other words, a voltage will be induced across the detection coil through such an electrostatic capacitance and when the induced voltage exceeds the voltage induced by the eddy current, an amplifier, not shown, will be overloaded and measurement errors will be resulted.

For this reason, it has been impossible to increase the frequency or the output voltage of the oscilator with the increase in the electromotive force induced by the eddy current.

SUMMARY OF THE INVENTION

Accordingly it is an object of this invention to provide an improved apparatus for measuring electric conductivity or resistivity a semiconductor wafer which can eliminate various diffeculties described above, can increase the imput current without the necessity of increasing the frequency or voltage of the oscillator output, can decrease the impedance of the exciting circuit and can match the phases of the electromotive forces in respective detection circuit whereby enabling accurate measuring of the conductivity or resistivity without error.

Another object of this invention is to provide an improved apparatus for measuring electric conductivity or resistivity which can measure accurately without causing any variation in the phase difference in a synchronous rectifying circuit even when the temperature of a coil and a capacitor connected in series with an exciting coil varies.

Still another object of this invention is to provide an improved apparatus for measuring electric conductivity and resistivity wherein the magnetic flux produced by the exciting coil and the detection coil is radiated in the form of fine beams and the flux density is increased whereby the size of the loop of the eddy current induced in a sample to be measured is decreased and the value of the eddy current is increased thereby enabling accurate measuring even at the periphery of the sample without decreasing the sensitivity.

A further object of this invention is to provide an improved apparatus for measuring electric conductivity or resistivity capable of eliminating the effect of the electrostatic capacitance between the exciting and detection coils and a sample inserted between these coils and can provide accurate measurements with increased frequency and voltage of the output from the oscillator.

According to this invention these and further objects can be attained by providing apparatus for measuring electric conductivity or resistivity of a semiconductor wafer, comprising a source of alternating current, a measuring exciting coil connected to the source, a measuring detection coil spaced apart a predetermined distance from the exciting coil, a compensating exciting coil connected in series with the measuring exciting coil, a compensating detection coil disposed to oppose the compensating exciting coil, means to connect differentially the measuring detection coil and the compensating detection coil so as to cancel each other the electromotive forces induced in the measuring detection coil and the compensating detection coil by the mutual inductance between the measuring exciting coil and the measuring detection coil whereby when the sample is inserted between these coils an electromotive force corresponding to the conductivity or resistivity of the sample is induced in the measuring detection coil by the mutual inductions between the measuring exciting coil and the sample and between the sample and the measuring detection coil.

BRIEF DESCRIPTION OF THE DRAWINGS

Further objects and advantages will be more fully understood from the following detailed description taken in conjunction with the accompanying drawings in which(:)

FIG. 1 shows a simplified connection diagram to explain the principle of the invention;

FIG. 2 is a connection diagram, partly in block, of one embodiment of this invention;

FIGS. 3 to 5 are diagrams showing various examples of the construction of the exciting coil and the detection coil and the flux distribution thereof;

FIG. 6 shows another example of the exciting coil;

FIG. 7 is a plan view of an electrostatic shield plate, and

FIG. 8 is a plan view of a modified electrostatic shield plate.

DESCRIPTION OF THE PREFERRED EMBODIMENTS

Refering now to FIG. 2 of the accompanying drawings, a preferred embodiment shown therein comprises an oscillator OSC which is connected to supply an alternating current to an exciting circuit 1 through a transformer T. The exciting circuit 1 comprises a first series resonance circuit including an exciting coil 11 for measuring and a capacitor $C_1$ connected in series therewith, and a second series resonance circuit including a compensating exciting coil $L_{31}$ and a capacitor $C_2$ which are connected in series to the coil $L_{31}$, the first and second resonance circuits being connected in series to each other with the juncture grounded. A detection coil $L_{22}$ for measurement is disposed to confront the exciting coil $L_{11}$ with a predetermined spacing therebetween. Similarly, a detection coil $L_{42}$ for measurement is disposed to confront the compensating detection coil $L_{31}$ with a predetermined spacing therebetween, coils $L_{22}$ and $L_{42}$ being connected differentially to form a detection coil $L_2$. A resistor $R_1$ is connected in parallel with detection coil $L_{22}$ and a resistor $R_2$ is connected in parallel with compensation detection coil $L_{42}$. A resistor $R_3$ is connected across the output terminals of the detection circuit 2. A sample S to be measured, such as a semiconductor wafer, is removably inserted between the exciting and detection coils $L_{11}$ and $L_{22}$. A reference semiconductor wafer may be positioned between compensating exciting coil $L_{31}$ and compensating detecting coil $L_{42}$ for comparison.

The output voltage from the detection circuit 2 is amplified by an amplifier $AMP_1$, and passed through a bandpass filter BS to eliminate higher harmonics and noise component and then amplified by a second amplifier $AMP_2$. The output from amplifier $AMP_2$ is applied to a phase shifter SP to shift the phase by 90° with respect to the induced voltage in the compensating detecting coil $L_{42}$. The phase shifted voltage is applied to a synchronous rectifier or a synchronous detector DET. The voltage induced in the compensating detection coil $L_{42}$ is amplified by a third amplifier $AMP_3$ and is then supplied to the synchronous rectifier to act as a reference voltage for synchronous rectification. The output from the synchronous rectifier DET is applied to an operation circuit AR in which the output of the rectifier is divided by a data representing the thickness of the sample and then the quotient is multiplied by a constant K to obtain an output proportional to the resistivity of the sample under test. The output from the operation circuit AK is supplied to an indicator IND such as a direct reading meter or a digit display the measured value of tube to display the resistivity.

The detection coils $L_{22}$ and $L_{42}$ are preferably designed to have the same electric characteristic as exciting coils $L_{11}$ and $L_{31}$. With this construction, in the absence of the sample S between excitation coil $L_{11}$ and detection coil $L_{22}$ the voltages induced in detection coils $L_{22}$ and $L_{42}$ are caused only by the mutual inductance between exciting coils $L_{11}$ and $L_{31}$. Since these induced voltages have the same phase and the same magnitude they cancel with each other so that only a low unbalanced voltage appears across the output terminals of the detection circuit 2 thereby preventing amplifiers from overloading. As such a low unbalanced voltage is converted into a component having a phase difference of 90° by the synchronous rectifier DET, no detector output is created. Upon insertion of the sample S between coils $L_{11}$ and $L_{22}$ a voltage is induced in the detection coil $L_{22}$ by the magnetic flux produced by the eddy current induced in the sample and having a value inversely proportional to the resistivity of the sample S. When rectified by the synchronous rectifier DET after passing through phase shifter SP, this voltage has a phase difference of 90° with respect to the voltage induced in the compensating detection coil $L_{42}$, so that two voltages from coils $L_{22}$ and $L_{42}$ have the same phase in the synchronous rectifier DET. The output from rectifier DET is applied to indicator IND to indicate the conductivity or resistivity of the sample. In this case, the current i flowing through coils $L_{11}$ and $L_{22}$ and the operating frequency of the oscillator are assumed to be constant.

As the exciting circuit connected to the oscillator OSC comprises two series resonance circuits tuned to the output frequency of the oscillator and are connected in series and also the juncture between the resonance circuits is grounded it is not only possible to cause the same current to flow through coils $L_{11}$ and $L_{31}$ but also to decrease the input impedance. It is also possible to increase the current by a factor of $Q = wr/R$. Accordingly, it is possible to increase the input current without the necessity of increasing the frequency and the voltage of the output from the oscillator thereby increasing the output voltage of the detection circuit 2. For this reason, it is possible to accurately measure the conductivity or resistivity of a sample having a high resistivity such as a semiconductor wafer without the fear of being masked by the noise current. By decreasing the diameters of exciting coils $L_{11}$ and $L_{31}$ it is possible to increase the accuracy of measurement at the periphery of the wafer.

Although in the above described embodiment the voltage induced in the compensating detection coil $L_{42}$ is applied to the synchronous rectifier circuit DET to act as the reference voltage the output from the oscillator OSC can also be used as the reference voltage. Instead of shifting the phase of the detected voltage by 90° by means of phase shifter SP, it is also possible to shift the phase of the reference voltage.

As above described, according to this invention since the voltage induced in the compensating detection coil $L_{42}$ is used as the reference voltage applied to the synchronous rectifier circuit DET even when the circuit constant of coils $L_{11}$, $L_{22}$, $L_{31}$ and $L_{42}$ and capacitors $C_1$ and $C_2$ are varied due to temperature variation, for example, as the input to the synchronous rectifier DET and the reference voltage vary synchronously the phase of the output of the rectifier is not varied with ensuring accurate measuring.

FIGS. 3 and 4 illustrate a modification of this invention designed to improve the efficiency of the magnetic coupling between the exciting coil and the detection coil wherein said coils $L_{11}$, $L_{22}$, $L_{31}$ and $L_{42}$ are constructed as shown in FIG. 3. More particularly, the exciting coil $L_{11}$ and the detection coil $L_{22}$ comprise opposed U shaped magnetic cores 41 and 42 respectively contained in cup shaped cylindrical casings 31 and 33. While the casings 31 and 33 are shown as bottomed cups they may take the form of cylinders. Exciting coils 51 and 52 are wound on cores 41 and 42, respectively with polarities such that poles 41a and 41b and poles 51a and 51b of the same cores will have the same polarity. The casings 31 and 32 and the cores 41 and 42 may be made of ferrite, for example.

Since coils $L_{11}$, $L_{22}$, $L_{31}$ and $L_{42}$ are constructed as above described and since the poles 41a and 41b of core 41 of coil $L_{11}$ and excited to have the same polarity N as shown in FIG. 4, the magnetic flux flows in the same direction from these poles toward sample S to be measured. Since fluxes flow between opposite poles 41a, 41b and 51a and 51b of the opposite polarities the fluxes concentrate at the center to form a fine beam of high density. Accordingly, it is possible to concentrate the flux at a relatively narrow region of the sample S with the result that the loop of the current induced is small. Thus, in a case where a peripheral portion the sample is to be measured, there is no fear of intercepting a portion of the loop of the eddy current thereby disturbing the same. For this reason, it is impossible to measure any portion of the sample with the same accuracy.

Although in this embodiment U shaped cores are disposed in the casings 31 and 32 it should be understood that the configuration of the core is not limited to this particular configuration and that cores of the there leg construction can equally be used. It is only necessary to use a core having a plurality of poles of the same polarity which are disposed side-by-side relationship in the opening of the casing.

The same advantage can also be realized in the detection coils whereby it is possible to limit the portion to be detected to a narrow area thereby decreasing the adverse effect of the noise.

FIG. 5 shows a modification of the embodiment shown in FIGS. 3 and 4 wherein exciting coil $L_{11}$ for measurement and detection coil $L_{22}$ comprised bar shaped magnetic cores 41 and 42 disposed in cup shaped magnetic casings 31 and 32, respectively, with the poles of the cores positioned at the openings of the casings. Coils 51 and 52 are wound on the cores 51 and 52, respectively. Again ferrite may be used as the material for casings 31, 32 and cores 41 and 42, respectively.

Since the cores and coils are contained in magnetic casings 31 it is possible to prevent leakage of the flux and the interference caused by external induction. In this embodiment, it is possible to concentrate the flux into a fine beam at the center thereby manifesting all advantages of the embodiment shown in FIGS. 3 and 4.

FIGs. 6 to 8 illustrate further modifications wherein an electrostatic shield plate CSP is interposed between the sample S and the exciting coil $L_{11}$ for measurement. The electrostatic shielding plate CSP includes an insulative substrate 3 and a thin film 4 of nonmagnetic metal (copper, for example) in the form of comb teeth or a rattan blind handed on the substrate 3 with the metal film 4 grounded. The metal film 4 may be formed by vacuum deposition or etching process. Alternatively, the shielding plate may be formed by a plurality of fine electrodes which are suitably spaced apart or may be formed of metal films of any configuration provided that these films do not form closed circuits for the eddy current, do no prevent the magnetic flux from passing through them and can manifest the desired electrostatic shielding effect. FIG. 8 shows a modified metal films in which a pair of comb tooth shaped metal films 5 and 6 are disposed to oppose each other with thin teeth interleaved.

The electrostatic shielding plate CPS interposed between the exciting coil $L_{11}$ and the sample eliminates the effect of the electrostatic capacitance between these members so that it is possible to prevent the output of the oscillator from being transmitted from the exciting coil $L_{11}$ to the detection coil $L_{22}$ through the electrostatic capacitance thereby preventing the error in measurement caused thereby. For this reason it is possible to increase the frequency and the voltage of the output from the oscillator to increase the input current to the exciting coil thereby increasing the voltage detected by the detection coil and improving the accuracy of the measurement.

Although the invention has been shown and described in forms of specific embodiments thereof it will be clear that many changes and modifications will readily occur to one skilled in the art without departing from the true spirit and scope of the invention as defined in the appended claims.

What is claimed is:

1. An apparatus for measuring electric conductivity or resistivity of a semiconductor wafer with no electric contact to said wafer, comprising
    an exciting circuit including a first extending coil for measuring, and a second exciting coil for compensating which are connected in series to each other,
    an oscillator for supplying an alternating current to said first and second exciting coils,
    a detecting circuit having a first detecting coil which is positioned spaced apart from said first exciting coil to form a gap therebetween, said wafer being inserted in said gap for measurement, and a second detecting coil for compensating which is connected in series opposition to said first detecting coil and is magnetically connected to said second exciting coil, thereby a differential output being obtained between each end of said first and second detecting coils,
    a pair of U-shaped magnetic cores on which said first coils, respectively, are wound in such arrangement that the ends of each said magnetic core have the same polarity but the opposite polarity with respect to the ends of the other,
    a bandpass filter means for eliminating higher harmonics and noise component being provided in an output portion of said detecting circuit,
    a phase shifter means operatively connected to said bandpass filter means for shifting the phase of the output of said bandpass filter means by 90° with respect to the phase of the voltage induced in said second detecting coil,
    a synchronous rectifier means for rectifying synchronously the output of said phase shifter with reference to the output across said second detecting coil,
    an operation circuit means for obtaining an output proportional to the electric conductivity or resistivity of said wafer from the output of said synchronous rectifier means and data concerning the thickness of said wafer, and an indicator means for indicating the output of said operation circuit means.

2. The apparatus as set forth in claim 1, wherein
    an electrostatic shielding plate is interposed between said first exciting coil and said wafer,
    said electrostatic shielding plate being shaped to prevent the formation of a closed circuit for the eddy current induced by the magnetic flux produced by said first exciting coil.

3. The apparatus according to claim 2 wherein said electrostatic shielding plate comprises an insulative substrate and a thin metal film in the form of a comb.

4. The apparatus, as set forth in claim 2, wherein said electrostatic shielding plate comprises an insulative substrate and a pair of thin metal films in the form of comb, said combs being opposite each other with their teeth interleaved.

5. The apparatus, as set forth in claim 1, further comprising
    a first condensor connected in series to said first exciting coil to form a first series resonance circuit,
    a second condensor connected in series to said second exciting coil to form a second series resonance circuit, and
    said first and second series resonance circuits are connected in series to each other.

6. The apparatus, as set forth in claim 1, further comprising
    a first resistor connected in parallel to said first detector coil to form a first parallel circuit,
    a second resistor connected in parallel to said second detector coil to form a second parallel circuit, and
    said first and second parallel circuits are connected such that a differential output between said first and second parallel circuits is obtained.

7. The apparatus, as set forth in claim 1, further comprising
    a first cylindrical casing made of a magnetic material and a second cylindrical casing made of magnetic material, each of said casings being closed at one end thereof and arranged in such a manner that the open ends thereof face each other and are spaced from each other forming said gap into which said wafer is inserted, said first magnetic core is contained in said first cylindrical casing and said second magnetic core is contained in said second cylindrical casing.

* * * * *